US012783580B2

(12) United States Patent
Bergqvist et al.

(10) Patent No.: US 12,783,580 B2
(45) Date of Patent: Nov. 3, 2026

(54) METHOD, SYSTEM, AND PROGRAM FOR SEARCHING SIMILAR CONTENT BASED ON LARGE LANGUAGE MODELS

(71) Applicants: CJ OliveNetworks Co., Ltd., Seoul (KR); CJ ENM CO., LTD., Seoul (KR)

(72) Inventors: Emma Bergqvist, Seoul (KR); Sung Bum Hu, Seoul (KR); Ye Eun Chun, Seoul (KR); Dong Il Shin, Seoul (KR); Hae Jeong Koh, Seoul (KR); Kyong Mook Lim, Seoul (KR); So Yeon Nam, Seoul (KR); Tae Ju Kwon, Seoul (KR); Jung Jun Kim, Seoul (KR); Seung Ji Kim, Seoul (KR); Se Un Park, Seoul (KR); Byung Hak Kim, Seoul (KR)

(73) Assignees: CJ OLIVENETWORKS CO., LTD., Seoul (KR); CJ ENM CO., LTD., Seoul (KR)

( * ) Notice: Subject to any disclaimer, the term of this patent is extended or adjusted under 35 U.S.C. 154(b) by 0 days.

(21) Appl. No.: 18/974,948

(22) Filed: Dec. 10, 2024

(65) Prior Publication Data

US 2026/0003908 A1 Jan. 1, 2026

(30) Foreign Application Priority Data

Jun. 28, 2024 (KR) ........................ 10-2024-0085659

(51) Int. Cl.

| | |
|---|---|
| ***G06F 17/00*** | (2019.01) |
| ***G06F 7/00*** | (2006.01) |
| ***G06F 16/2457*** | (2019.01) |
| ***G06F 16/735*** | (2019.01) |

(52) U.S. Cl.
CPC ...... *G06F 16/735* (2019.01); *G06F 16/24578* (2019.01)

(58) Field of Classification Search
CPC ......................... G06F 16/735; G06F 16/24578
USPC .......................................................... 707/728
See application file for complete search history.

(56) References Cited

U.S. PATENT DOCUMENTS

| | | | | |
|---|---|---|---|---|
| 2013/0124984 | A1 * | 5/2013 | Kuspa | H04N 21/435 715/255 |
| 2017/0213243 | A1 * | 7/2017 | Dollard | G06Q 30/0249 |
| 2019/0205373 | A1 * | 7/2019 | Walsh | H04N 21/435 |
| 2022/0172502 | A1 | 6/2022 | Liberty | |
| 2024/0256592 | A1 * | 8/2024 | O'Neill | G06F 16/435 |
| 2024/0403563 | A1 * | 12/2024 | Bex, IV | G06F 16/383 |
| 2025/0131934 | A1 * | 4/2025 | Amadori | G10L 13/033 |
| 2025/0190696 | A1 * | 6/2025 | Okano | G06F 40/20 |

FOREIGN PATENT DOCUMENTS

| | | | |
|---|---|---|---|
| KR | 100347710 | B1 | 10/2002 |
| KR | 10-2022-0143229 | A | 10/2022 |
| KR | 10-2023-0073138 | A | 5/2023 |

OTHER PUBLICATIONS

The KR Office Action dated on Apr. 3, 2026.

* cited by examiner

*Primary Examiner* — Pavan Mamillapalli
(74) *Attorney, Agent, or Firm* — Harvest IP Law, LLP

(57) ABSTRACT

The present invention relates to a method, system, and program for searching similar content based on large language models. Specifically, it pertains to a method, system, and program that allow users to search for similar content based on script texts and to compare and analyze the content.

18 Claims, 6 Drawing Sheets

【FIG. 1】
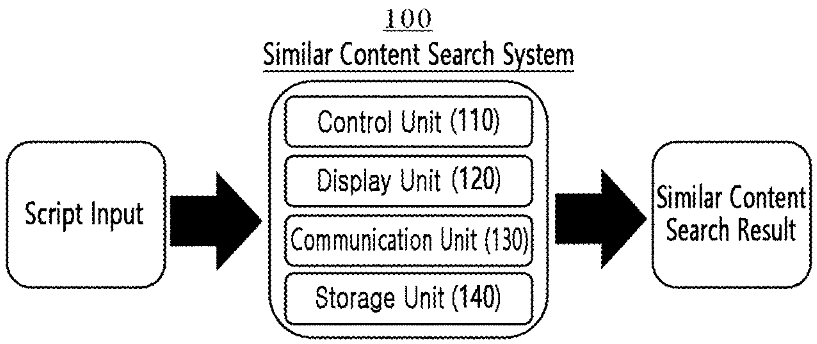
【FIG. 2】
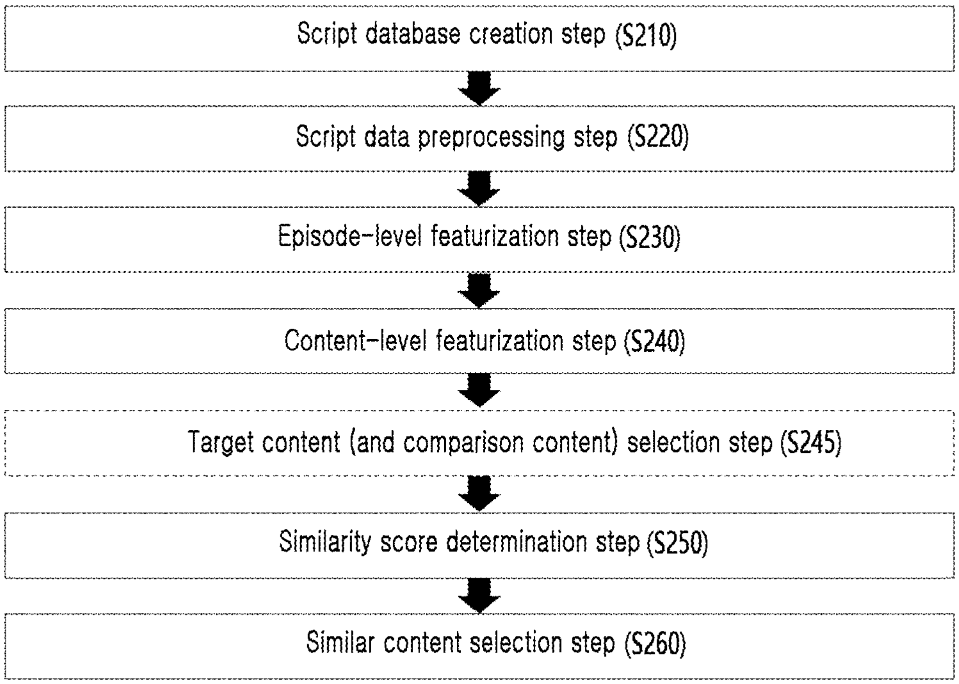

【FIG. 3】
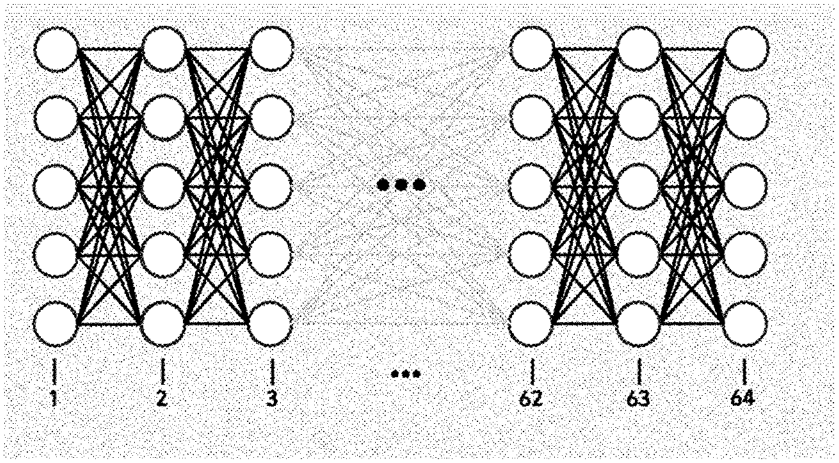
【FIG. 4】
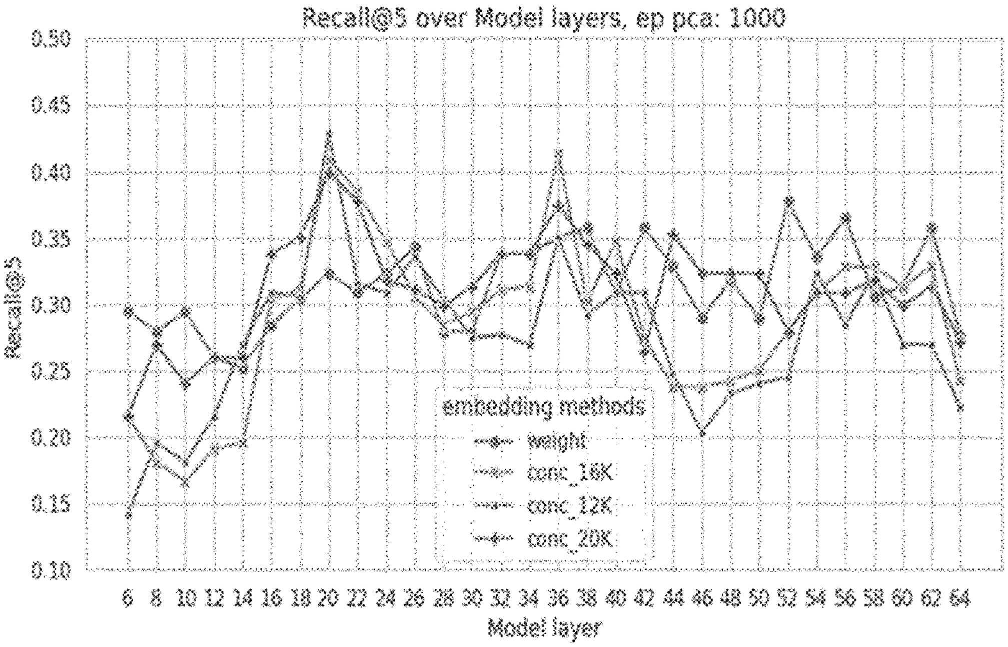

【FIG. 5】
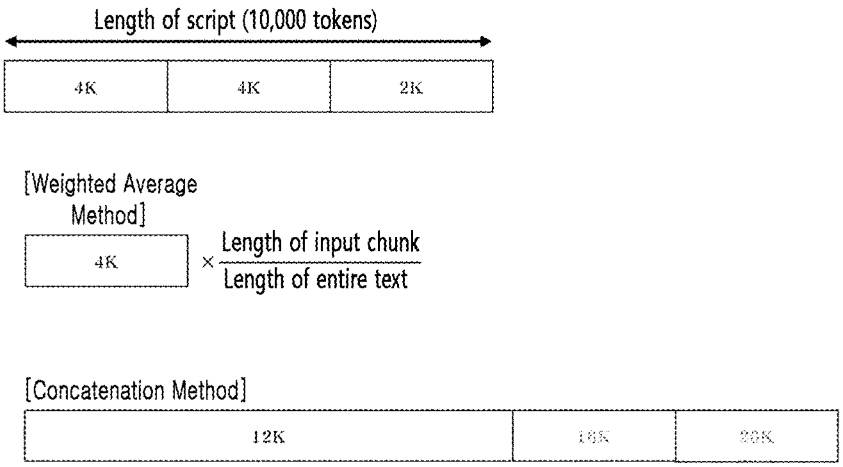
【FIG. 6】
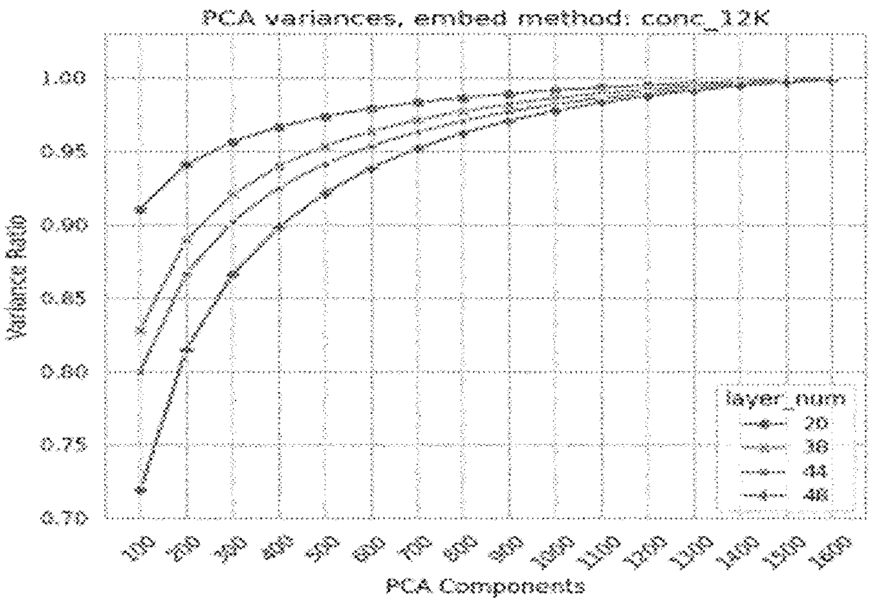

【FIG. 7】
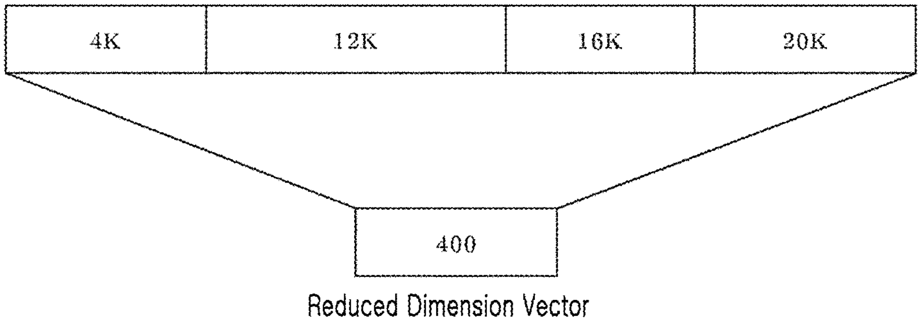
【FIG. 8】
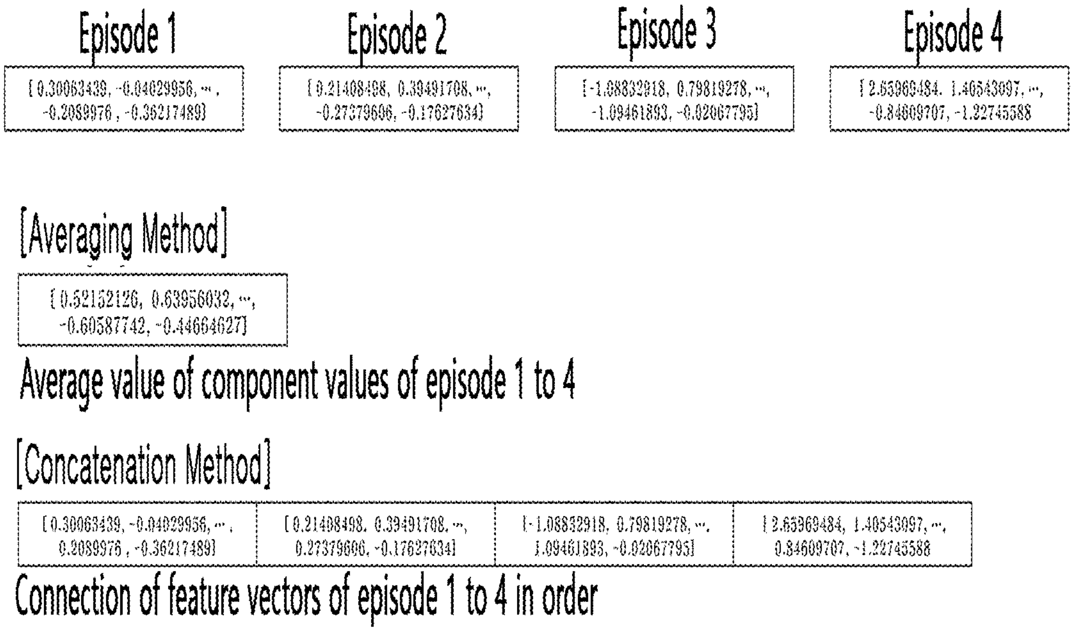

【FIG. 9】
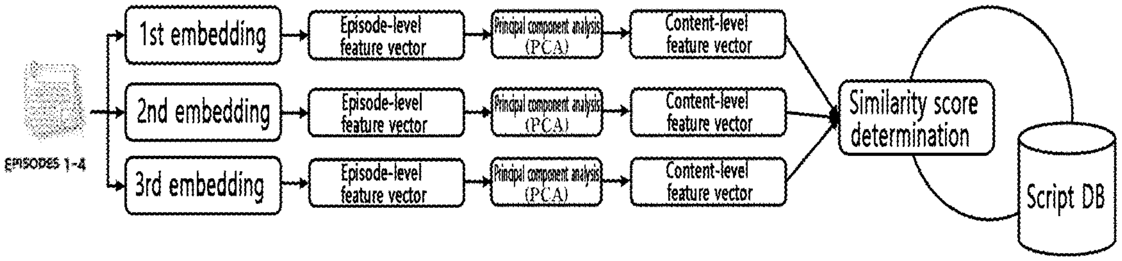
【FIG. 10】
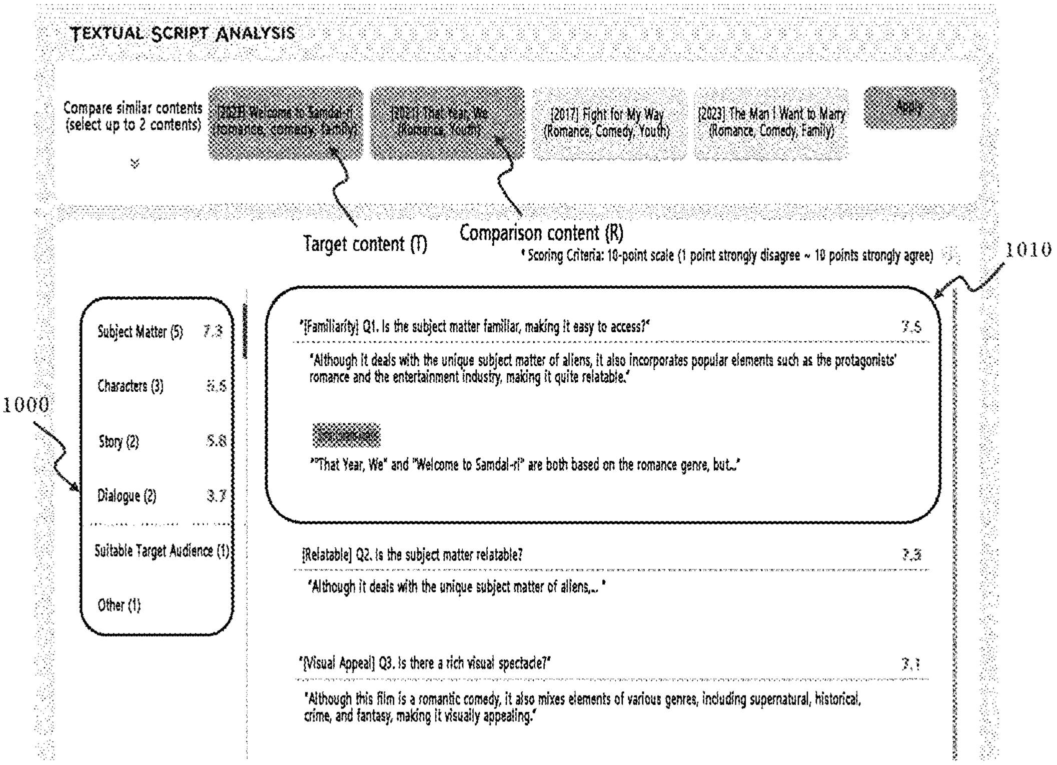

【FIG. 11】
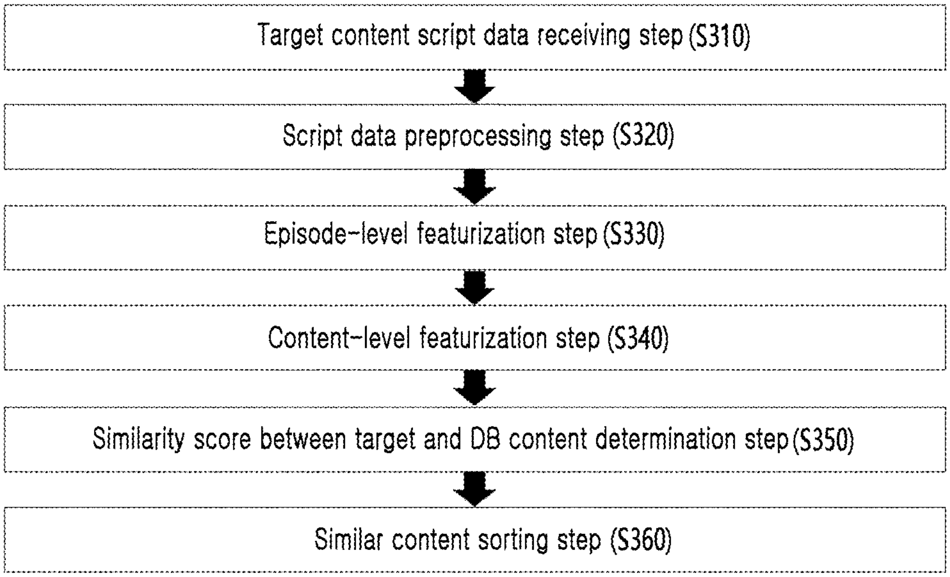

METHOD, SYSTEM, AND PROGRAM FOR SEARCHING SIMILAR CONTENT BASED ON LARGE LANGUAGE MODELS

CROSS-REFERENCE TO RELATED APPLICATIONS

This application claims the priority benefit of Korean Patent Application No. 10-2024-0085659, filed Jun. 28, 2024, the entire content of which is hereby incorporated by reference herein.

FIELD

The present disclosure relates to a method, system, and program for searching for similar content based on large language models. More specifically, the present disclosure relates to a method, system, and program that enables a user to search for similar content based on the script texts of various content and compare and analyze the content.

DESCRIPTION OF RELATED ART

Conventionally, similar content searches have primarily utilized the collaborative filtering model, leveraging user behavior data to recommend content. However, collaborative filtering faces limitations when dealing with new dramas or scripts, as it struggles to assess similarity based solely on textual content and its derivative information (e.g. genre, setting, period, theme). Furthermore, in the context of dramas and similar media, similar content searches are typically conducted based on textual content in conjunction with supplementary elements like genre, setting, period, and theme. In such cases, the generated search results often fail to reach an adequate level of accuracy, leading to user dissatisfaction. The present disclosure addresses these shortcomings and enables content-based similar content searches.

SUMMARY

The present disclosure aims to enable more accurate and efficient similar content searches using text-based content similarity searches.

In particular, the present disclosure aims to perform preprocessing tasks that enable script-based content similarity searches, and proposes several detailed processing tasks that can be applied during preprocessing to enhance the accuracy of search results.

In some example embodiments of the disclosure, the method for searching similar content comprises the steps of:

(a) a script data preprocessing step for preprocessing script data;

(b) an episode-level featurization step for extracting features from the preprocessed script data for each individual episode;

(c) a content-level featurization step for generating features for specific content containing multiple episodes by synthesizing the features extracted during the episode-level featurization step;

(d) a similarity score determination step in which the features of the specified content are compared with the features of other content; and (e) a step in which content that is similar to the target content is selected if the similarity score meets predetermined criteria.

In the above example embodiments, the features extracted in the episode-level featurization step are generated as vectors having multiple dimensions, wherein the vectors are episode-level feature vectors. The step of generating the episode-level feature vectors comprises a step in which script data is embedded using a pre-trained large language model (PLLM). The step of embedding the script data using the PLLM comprises: a step in which the script data is divided into multiple chunks; a step in which vectors corresponding to the multiple chunks are generated using the PLLM; and a step in which an episode-level feature vector is generated using the vectors corresponding to the multiple chunks. The step in which an episode-level feature vector is generated using the vectors corresponding to the multiple chunks comprises generating the episode-level feature vector using a weighted average method, wherein the vectors corresponding to the plurality of chunks are weighted according to the length of each chunk. The same step further comprises generating the episode-level feature vector by sequentially concatenating the vectors corresponding to each chunk. The step in which the script data is embedded using the PLLM further comprises embedding the script data into any internal layer that is not the final layer of the PLLM. The step of generating episode-level feature vectors further comprises embedding the script data using a Doc2Vec model to generate the episode-level feature vectors. The same step further comprises embedding the script data using TF-IDF (Term Frequency-Inverse Document Frequency).

In the above example embodiments, the content-level featurization step can be characterized in that it generates a single vector for the target content based on the features extracted in the episode-level featurization step, with the single vector being referred to as the content-level feature vector. The content-level featurization step is further characterized in that it generates the content-level feature vector by averaging the episode-level feature vectors generated in the episode-level featurization step. The content-level featurization step is further characterized in that it generates the content-level feature vector by sequentially concatenating the episode-level feature vectors generated in the episode-level featurization step.

In the above example embodiments, the similarity score determination step comprises a step of calculating the cosine similarity between the content-level feature vector of the target content and the content-level feature vector of other content to generate a first similarity score. The similarity score determination step further comprises: a step of normalizing the first similarity score; and a step of applying weights to the normalized first similarity score to generate a second similarity score. The method further comprises a step of generating a script database that stores multiple script data prior to step (a), and the other content in step (d) can be stored in the script database.

In another embodiment of the disclosure, the similarity content search system may comprise a CPU and memory, wherein the CPU executes commands stored in the memory to implement the similarity content search method, the method comprising: (a) a preprocessing step for preprocessing script data; (b) an episode-level featurization step for extracting features from the preprocessed script data for each individual episode; (c) a content-level featurization step for generating features for specific content containing multiple episodes by synthesizing the features extracted during the episode-level featurization step; (d) a similarity score determination step in which the features of the specified content are compared with the features of other content; and (e) a step in which content that is similar to the target content is selected if the similarity score meets predetermined criteria.

In another embodiment of the disclosure, the similarity content search system may comprise a CPU and memory, wherein the CPU executes commands stored in the memory to implement the similarity content search method, the method comprising: (a1) a script data receiving step for receiving script data for specific target content; (b1) a preprocessing step for preprocessing the script data; (c1) an episode-level featurization step for extracting features from the preprocessed script data for each individual episode; (d1) a content-level featurization step for generating features for specific content containing multiple episodes by synthesizing the features extracted during the episode-level featurization step; (e1) a step to calculate a similarity score between the target content and the other contents stored in the script database; and (f) a step in which content similar to the target content is selected based on the similarity score.

Effects

According to the present disclosure, the similarity between content can be identified more accurately and quickly.

Furthermore, the present disclosure allows for the systematic understanding of the overall characteristics of content based solely on scripts containing extensive text.

Additionally, according to the present disclosure, the accuracy of similar content searches can be improved by adopting various types of embedding methods and enabling comparison by combining features obtained through embedding when assessing content similarity.

BRIEF DESCRIPTION OF DRAWINGS

FIG. 1 is a diagram for understanding an overview of the similar content search system and method according to the present disclosure.

FIG. 2 illustrates the steps of the similar content search method according to the present disclosure.

FIG. 3 conceptually illustrates a neural network composed of 64 layers.

FIG. 4 is a graph illustrating individual results by using the vectors coming from different internal layers and how to select the most effective result or layer when generating text embeddings using a PLLM with the highest performance in y-axis.

FIG. 5 illustrates the method of generating embeddings by dividing a script into chunks.

FIG. 6 is a graph illustrating how the ratio illustrating how the original data variance ratio changes based on the number of principal components in the principal component analysis (PCA).

FIG. 7 conceptually illustrates a high-dimension vector being reduced to a low-dimension vector.

FIG. 8 is a diagram for conceptually understanding the episode-level featurization step.

FIG. 9 schematically illustrates the entire process from script embedding to similarity score determination.

FIG. 10 illustrates the final selected similar content being presented to the user through a user interface.

FIG. 11 illustrates a similar content search method according to another embodiment of the present disclosure.

DETAILED DESCRIPTION

Hereinafter, exemplary embodiments of the present disclosure will be described in detail with reference to the accompanying figures. In assigning reference numerals to the components of each figure, the same components may have the same reference numerals even if they are shown in different figures. In describing the embodiments, detailed explanations of related known configurations or functions may be omitted if it is determined that such explanations may obscure the gist of the present technical idea. In this specification, the use of terms such as "includes," "has," or "is made of" does not exclude the possibility of additional components unless otherwise specified. If a component is expressed in the singular, it may include the plural unless explicitly stated otherwise.

In describing the components of the present disclosure, terms such as first, second, A, B, (a), (b), etc., may be used. Such terms are used only to distinguish one component from another and do not limit the nature, order, sequence, or number of the components.

In describing the positional relationship of the components, if two or more components are described as being "connected," "coupled," or "joined," it should be understood that the two or more components may be directly "connected," "coupled," or "joined," or that the two or more components may be "connected," "coupled," or "joined" with another component interposed therebetween. Here, the other component may be included in one or more of the two or more components that are "connected," "coupled," or "joined" to each other.

In describing the temporal or sequential relationship of components, operation methods, manufacturing methods, etc., for example, when the temporal or sequential relationship is described using terms such as "after," "subsequently," "next," or "before," the relationship may not be continuous unless "immediately" or "directly" is used.

When a numerical value or corresponding information about a component is mentioned, the numerical value or corresponding information may be interpreted as including an error range that may occur due to various factors, even without any separate explicit description.

In various embodiments of the present disclosure, the script is exemplified as a drama script, but the use of the script is not limited to dramas, and various embodiments of the present disclosure may also be applied to scripts used in movies or plays. That is, in various embodiments of the present disclosure, the content may correspond to not only dramas, but also movies, plays, animations, etc.

In various embodiments of the present disclosure, the meta-information or metadata may include genres, keywords, characters, etc. In various embodiments of the present disclosure, the script may include a screenplay.

In addition, in the detailed description, terms such as embedding and vector may be used interchangeably. An embedding can be defined as a vector or a set of vectors that mathematically represents the characteristics of data such as text or images. In some cases, the term embedding may also be used to refer to an operation of performing embedding, or to refer to the result obtained according to such an operation.

FIG. 1 illustrates an overview of the present disclosure, which aims to provide search results for content with high similarity upon inputting any script, such as a text-based script. The similar content search system (100) is a computing system proposed in this detailed description, and the similar content search method, which will be described later, is executed by the similar content search system (100).

Before describing the similar content search method in detail with reference to FIG. 1, the basic configuration of a system according to an embodiment, i.e., a system that performs computations for searching similar content, will be first described.

Referring to FIG. 1, the similar content search system includes a control unit (110), a display unit (120), a communication unit (130), and a storage unit (140).

The control unit (110) performs the overall control functions of the similar content search system and may control other units. The control unit (110) may be, for example, a processor (CPU or GPU) or an engine. In various embodiments of the present disclosure, the control unit (110) may be located in an external system (e.g., a server). The control unit (110) may perform various operations of the similar content search system using programs and data stored in the storage unit (140).

The display unit (120) displays various content using a user interface and/or a graphical user interface stored in the storage unit (140) under the control of the control unit (110). Here, the content displayed on the display unit (120) may include various text or image data (including various information data) and menu screens including data such as icons, list menus, and combo boxes. Further, the display unit (120) may be a touch screen.

The display unit (120) may include a liquid crystal display (LCD), a thin film transistor-liquid crystal display (TFT LCD), an organic light-emitting diode (OLED) display, a flexible display, a three-dimensional display (3D display), an e-ink display, etc., and the technology used for the display unit (120) is not limited to the examples described above.

The communication unit (130) communicates with any internal component or at least one external system through a wired/wireless communication network. Here, wireless Internet technologies may include Wireless LAN (WLAN), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), IEEE 802.16, Long Term Evolution (LTE), LTE-Advanced (LTE-A), Wireless Mobile Service Broadband (WMBS), 5G mobile communication service, Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, Wi-Fi Direct, Long Range (LoRa), etc., and the technology used for the communication unit (130) is not limited to the examples described above. On the other hand, wired communication technologies may include, but are not limited to, Power Line Communication (PLC), USB communication, Ethernet, serial communication, optical/coaxial cables, etc.

The storage unit (140) stores programs and data according to various embodiments of the present disclosure. That is, the storage unit (140) may store a number of application programs, data for operation, and instructions that are run by the similar content search system. At least some of the application programs may be downloaded from an external system through wireless communication. In addition, at least some of these application programs may be pre-installed in the similar content search system.

The storage unit (140) may include at least one storage medium among Flash Memory Type, Hard Disk Type, Multimedia Card Micro Type, card type memory (e.g., SD or XD memory, etc.), magnetic memory, magnetic disk, optical disk, Random Access Memory (RAM), Static Random Access Memory (SRAM), Read-Only Memory (ROM), Electrically Erasable Programmable Read-Only Memory (EEPROM), and Programmable Read-Only Memory (PROM).

In various embodiments of the present disclosure, the similar content search system may not include at least some of the components of FIG. 1 and may further include component(s) not shown in FIG. 1. For example, the similar content search system may further include an input unit, and the input unit may receive a document through scanning. In another example, the similar content search system may operate without a separate communication unit.

The schematic configuration of the similar content search system according to the present disclosure has been described above with reference to FIG. 1. Hereinafter, the similar content search method, the detailed explanation of which has been deferred, will be described with reference to FIG. 2.

Referring to FIG. 2, the similar content search method begins with the script database creation step (S210). This step may necessarily include a process of collecting script data. For example, text data, more precisely, script data, for arbitrary content may be collected from accessible online sources (specific online cafes, bulletin boards, etc.). Here, "collecting" may mean downloading script data from the online sources, scraping it, or any other means or method for obtaining script data in text format. For reference, tools applicable to web scraping such as the Beautiful Soup library and Selenium WebDriver may be utilized in this process.

Alternatively, in this step, script data for drama episodes owned by the operator may be provided through internal sources and utilized to build the script database. That is, to securely obtain data without copyright issues and ensure the quality of the script data, script data may be obtained using internal sources. Furthermore, the script data obtained internally in this way can be solely stored in a separate storage space or made accessible only to users with designated accounts, enabling the security, quality, and rating of the script data to be managed.

After the script data is collected, each script is systematically managed by being mapped to a specific drama and episode. Not only is basic meta-information about an arbitrary script mapped to the corresponding drama and episode, but additional meta-information, such as the writer, broadcast year, and broadcast channel, can also be collected through online sources in this step and used to build the database. This meta-information can be used to compare similarities between dramas or to provide users with additional information about the dramas. For example, since works by a particular writer are likely to be highly similar, the writer information can be used to search for or recommend similar dramas.

On the other hand, considering that scripts for multiple episodes are needed to accurately analyze content, content with too few collected scripts may be filtered out in this step. For example, content for which scripts from at least the first to the fourth episodes have not been collected may be filtered out in this step and excluded from the script database, so that only script data for content that can be accurately analyzed and compared is stored. Since early episodes often introduce the main characters, background settings, and conflicts between the characters, this increases the reliability of the database and enables drama analysis based on sufficient information. Therefore, substantial analysis is enabled only for content with scripts that include sufficient information. It is understood that the number of early episode scripts mentioned in the above description is merely an example and can be changed as needed.

Referring to FIG. 2, the similar content search method according to the present disclosure includes a data preprocessing step (S220). In this step, several preprocessing tasks may be performed on the collected script data.

As an example, in this step, a preprocessing task involving converting various formats of collected script data into a predetermined file format, e.g., a txt file, may be executed. The purpose of this task can be understood as managing data collected from various sources in a unified format and facilitating subsequent analysis processes. On the other hand, in cases where errors occur during the automatic file format conversion process or when a file cannot be converted, an editing interface may be presented to the user to allow for manual conversion or content modification.

Additionally, this stage may include script quality improvement tasks. Typically, scripts follow a scenario format that includes specific directions for scenes, narration, and dialogue. If these directions are not properly recognized during the conversion process, important information may be lost. Therefore, an automatic review of the scripts may be implemented, or users may be provided with an interface to manually review and modify the scripts as necessary. For example, if a direction indicating a scene transition is missing, the system may automatically or manually this add direction to clarify scene distinctions. Furthermore, script quality improvement tasks may involve correcting spelling and spacing errors, as well as removing unnecessary characters or symbols, thereby enhancing the accuracy of the text data. Sentence structure may also be analyzed to clarify sentence boundaries and distinguish between dialogue and narration, facilitating effective processing of text data in subsequent analysis stages.

Another example of a preprocessing task that may be performed in this step is the script breakdown. In the script breakdown, key information can be extracted from the storyline through a combination of rule-based algorithms and AI models. Rule-based algorithms are used to extract character names, place names, expressions of time, etc., based on predefined rules. For example, rules such as recognizing words starting with a capital letter as personal names or recognizing character strings with specific patterns as time expressions may be defined. Meanwhile, AI models are used to extract information that is difficult to obtain through rule-based algorithms. For instance, a deep learning-based named entity recognition model may be employed to extract characters, locations, and times, while a sentiment analysis model may be used to identify the emotional states of characters. Moreover, a relationship extraction model may be used to identify relationships between characters, and an event extraction model may be used to extract significant events in the storyline. The information derived from this script breakdown process, including details about characters, dialogue, and locations, may be used to represent the characteristics of each episode and may also be used in subsequent similarity searches.

After the preprocessing step, the similar content search method according to the present disclosure proceeds to an episode-level featurization step (S230). This step can also be understood as the extraction of features from each episode for which an individual script exists. Specifically, this step integrates text-based features that reflect the semantic meaning and grammatical structure of the script's textual content, along with script analysis-based features derived from previously extracted information such as scenes, characters, and dialogue, to enable the expression of each episode in various ways.

To extract the substantive features of the text from the scripts, text embeddings may be generated during this step. It is important to note that the term "text embeddings" may also be referred to as "episode-level feature vectors" in this detailed description. Text embeddings represent the semantic meaning and grammatical structure of the text in numerical form, allowing for efficient computing of various natural language processing tasks by converting script content into fixed-length vectors. Prior to generating text embeddings, a text preprocessing task may also be incorporated to more accurately represent the meaningful content of the scripts. This text preprocessing task may involve removing irrelevant characters, such as special symbols, and standardizing line breaks to ensure consistent formatting.

As previously mentioned, the episode-level featurization step (S230) does not exclusively generate text embeddings through a singular method; rather, it is characterized by the creation of embeddings using two or more distinct approaches. In this detailed description, three representative methods will be described: (i) an embedding method using a pre-trained large language model (PLLM), (ii) an embedding method that learns the entire script and represents the meaning of the script in vector form, and (iii) an embedding method that characterizes the text based on keywords within the script.

The first embedding method to be described is the text embedding method using PLLMs. PLLMs are trained on a large-scale text dataset and possess excellent capabilities for understanding context and semantics, particularly when fine-tuned on a specific corpus, such as Korean dramas.

PLLMs consist of multiple neural network layers, each designed to capture different types of semantic information. They are generally designed with an encoder-decoder architecture. In this architecture, the encoder layers process the text into a context-rich representation, and the decoder layers convert it back into human-readable text.

In the context of the present disclosure, a unique aspect is the identification of the optimal layer for similarity searches, which is not the final output layer, but rather at a different internal layer. This will be described with reference to FIGS. 3 and 4.

FIG. 3 conceptually illustrates a neural network composed of 64 layers. Generally, text input is processed through the first layer, and results are output from the 64th layer for use in subsequent operations. However, as shown in FIG. 4, a comparative analysis of results generated from layers 1 to 64 reveals that outputs from the 20th and 36th layers outperform those from the 64th layer.

For reference, the graph in FIG. 4 shows which layers of the model extract the most effective features for similar content searches when generating text embeddings using PLLMs. The x-axis (Model Layer) represents the layer number, and the y-axis (Recall@5) represents the evaluation metric. The evaluation metric, Recall@5, refers to the probability that similar content is included in the top 5 search results. A higher Recall@5 value can be interpreted as better similar content search performance. For example, if the Recall@5 value is 0.8, it means that there is an 80% probability that the top 5 results will include the user's desired result when a search is performed. In addition, for reference, the four lines in the graph represent different embedding methods. "Weight" represents the weighted average method, which calculates the average by multiplying the embedding vector of each chunk by the length of the chunk as a weight (dividing the text into multiple chunks, obtaining the embedding vector of each chunk, and then calculating the average by weighting proportionally to the length of each chunk). The methods "conc_12K", "conc_16K", and "conc_20K" represent concatenation methods that create vectors of 12K length, 16K length, and 20K length, respectively, by concatenating the embedding vectors of each chunk in order (dividing the text into multiple chunks, obtaining the embedding vector of each chunk, and then concatenating them in order to create a single long vector). These four embedding methods were used to obtain the evaluation metric results. This will be described in more detail later, in the description of FIG. 5.

In conclusion, referring to FIG. 4, it can be seen that the result output from the final layer (64th layer) of the PLLM is not necessarily the best result, and the results generated from internal layers (20th and 36th layers) may be more suitable for specific operations. This phenomenon occurs because each layer captures different semantic information from the text. The present disclosure may further include a task of obtaining and comparing results from multiple layers to find the optimal layer that best represents the semantic similarity of the text. Such task may exist separately, independent of the episode-level featurization step (S230).

On the other hand, due to the contextual length limitation of PLLMs, it is necessary to generate embeddings by dividing long script texts into chunks. The embeddings for each chunk can be processed using either a weighted average or concatenation method to generate the final embedding. The embedding generated in this way can be represented as a vector that concisely represents the text content of each episode. Hereinafter, with reference to FIG. 5, the so-called chunking method, i.e., a method for generating embeddings by dividing script text into chunks, will be described.

Chunking refers to the process of segmenting text into smaller units called chunks. The unit that an arbitrary model can process for text is called a token, with text being encoded and converted into these tokens. There is a limitation to the size of the text (document) that a given LLM can process, specifically a limit on the number of input tokens. For instance, if the average length of a script is 10,000 tokens, and the maximum context length (input length) that an LLM can handle is 4,096 tokens, the entire episode can be embedded generating chunks of 4,096 tokens or less to consider semantic separation of texts.

FIG. 5 illustrates two examples of the chunking method. The first is the weighted average method, which calculates the weight of an embedding chunk based on its input length. For example, assuming a script text consists of 10,000 tokens, the input chunks may consist of 4,096, 4,096, and 1,808 tokens, respectively (4,096+4,096+1,808=10,000). Each chunk is input to the PLLM and processed into an embedding in vector form. Each embedding is weighted by multiplying it by the length of the corresponding chunk, and the weighted embeddings are all added together and then divided by the total text length to calculate the final embedding. In other words, by assigning a higher weight to longer chunks, each chunk's contribution within the final embedding can be adjusted. This method ensures a balanced representation of the overall text's meaning.

The second chunking method is the concatenation method, which concatenates chunks by sequentially adding vectors one by one. For example, a long text can be divided into chunks of 4,096 tokens, a vector form embedding can be calculated for each chunk, and the embeddings, i.e., vectors, can be concatenated to create a single long vector. This method has the advantage of representing the characteristics of the entire text while preserving the order of information in long texts. On the other hand, if the script is excessively long, it may be truncated to a certain number of unit chunks (e.g., 4K), and if the script is too short, zero padding, which adds zeros to match the length, may be used.

Meanwhile, the multiple concatenated vectors, i.e., embeddings, have very high dimensions (4,096, 12,288, 16,384, 20,480, etc.). While such high-dimension vectors can capture detailed features of the text data, they can also include a lot of noise. Moreover, model training and computation for high-dimension vectors requires significant time and resources, which may ultimately degrade the performance of the overall algorithm for similar content searches. Therefore, a method for reducing the dimensions of high-dimension vectors may be necessary. In the present disclosure, principal component analysis (PCA) is used to reduce the dimensions of high-dimension vectors. PCA is a technique for reducing dimensions while preserving the variance of data as much as possible, and is known to be effective in removing noise and improving similarity search performance. When performing PCA, the selection of the number of principal components is very important because it determines how well the final embedding represents the characteristics of the entire text. The reason for this is that, if too few principal components are used, the converted data cannot cover all the important content characteristics of the original data, and if too many principal components are used, noise may negatively affect search performance. Referring to FIG. 6, in the present disclosure, the optimal number of principal components is exemplified as being between 100 and 1,600, preferably between 400 and 600, and more preferably 600. Referring to FIG. 6, the graph shows the variance ratio of the original data according to the number of principal components when reducing text embedding dimensions using PCA. For the embedding method in this analysis, the conc_12K concatenation method, i.e., a concatenated 12, 288-dimensional vector, was used. When PCA was performed using features extracted from the 20th, 38th, 44th, and 48th layers, while varying the number of principal components from 100 to 1, 600 for each layer, the resulting variance ratio was as depicted in FIG. 6. For reference, the x-axis in the graph (PCA Components) represents the number of principal components, and the y-axis (Variance Ratio) represents the variance ratio of the original data based on the number of principal components used. Considering that the closer the variance ratio is to 1, the more information from the original data is preserved, it can be seen from the graph that as the number of principal components increases, the variance ratio also increases. It can also be seen that when the number of principal components is 600 or more in each layer, the variance ratio is 95%; in other words, most of the information from the original data can be preserved. In the same manner, it can also be seen that when the number of principal components is 400 or more in each layer, more than 90% of the information of the original data can be preserved.

Meanwhile, FIG. 7 conceptually illustrates how a high-dimension vector is reduced to a low-dimension vector. This figure shows how an embedded vector with a high initial dimension, such as 4,096, 12,288, 16,384, or 20, 480, is finally reduced to a 400-dimensional vector through the PCA process described above. This transformation enables the long text of the script to be processed in a manner that facilitates effective subsequent operations for similarity content searches.

With reference to FIGS. 6 and 7, the method for reducing the dimensionality of high-dimensional vectors using the PCA (Principal Component Analysis) technique has been described. While the foregoing embodiments described the use of the PCA technique, it is to be understood that other types of dimensionality reduction techniques, such as auto-encoders, Linear Discriminant Analysis (LDA), and Uniform Manifold Approximation and Projection (UMAP), may also be used for reducing the dimensionality of high-dimensional data.

The text embedding method using PLLMs has been described above with reference to FIGS. 3 to 7.

Returning to the description of step S230 (episode-level featurization), the second embedding method will be described. Text embedding using the second method can be generated using models (e.g., Doc2Vec) that vectorize or featurize scripts consisting of long text paragraph by paragraph. For example, a Python library called Gensim can be used. This library can capture the semantic meaning of a script by considering the context of the words within the script. The present disclosure may include a process of training a Doc2Vec model using an entire script corpus. Through this, the model can learn to understand the contextual information of each script and generate a representative vector for each one. Vectors generated in this way concisely represent the semantic features of each script and can be used to calculate the similarity between scripts.

Furthermore, prior to Doc2Vec model training, the present disclosure may include a process of tokenizing script text using a tokenizer specialized for a specific language, such as the KoNLPy Okt package which is specialized for Korean, and performing morpheme analysis (using the morphs function). The tokenized and morpheme-analyzed text can be input to the Doc2Vec model in units of episode scripts for training. During the training process, the model can learn the contextual information of each episode script and generate a fixed-length vector representing each episode based on this learning. The generated vector concisely represents the semantic features of each episode and can be used to calculate the similarity between episodes.

The third embedding method involves generating sparse embeddings using a technique that characterizes text on a word-by-word basis, such as Term Frequency-Inverse Document Frequency (TF-IDF). This method is applied to textual content to produce numerical values that reflect the importance of each word within the entire script. It allows for the extraction of keywords from the document and can be used to calculate the similarity between documents. Equation 1 below is for calculating Term Frequency, which is a value indicating how often a specific word appears in a particular document. Equation 2 is for calculating the Inverse Document Frequency (IDF) value, which indicates how common a specific word is within the entire corpus (a collection of documents). A lower value indicates that the word is more common, while a higher value indicates that the word characterizes and represents a specific document. Equation 3 represents the weight that signifies the importance of a specific word in a particular document, and is calculated by multiplying TF and IDF. A larger TF-IDF value indicates that the word appears frequently within the document and is a crucial term that rarely appears in other documents.

$$TF = \frac{\text{Number of occurrences of specific word in document}}{\text{Total number of words in document}} \quad \text{[Equation 1]}$$

$$IDF = \log\left(\frac{\text{Total number of documents in corpus}}{\text{Number of documents containing specific word}}\right) \quad \text{[Equation 2]}$$

$$TFIDF = TF \times IDF \quad \text{[Equation 3]}$$

The TF-IDF values can be represented in the form of a sparse vector, which indicates the importance of each word. Sparse vectors typically contain mostly zero values, with the only non-zero values corresponding to important words. These sparse vectors can be utilized for text-based content similarity searches, enabling searching for content that is similar to the script provided by the user.

In one embodiment of the disclosure, an additional process may include performing text preprocessing using the noun tagging function of the KoNLPy Okt package. This process enhances the emphasis on key topics and entities by extracting only nouns from the Korean text. Moreover, in addition to individual words (unigrams), sequences of two consecutive words (bigrams) and three consecutive words (trigrams) may also be included in the TFIDF calculation to account for relationships between words.

The episode-level featurization step (S230) has been described above, with particular focus on the methods for embedding scripts.

Referring again to FIG. 2, after step S230, a content-level featurization step (S240), specifically at the drama level, can be executed. The content-level featurization step involves synthesizing the features extracted in step S230 to generate a representative feature vector that represents the entire content. This step facilitates understanding of the overall storyline, atmosphere, and character relationships of the content (drama) by combining the features of individual episodes. The vector generated in this step can be primarily used to find similar content.

FIG. 8 conceptually illustrates the content-level featurization step, where featurization can be performed using two primary methods.

The first method involves averaging the features of the episodes. For instance, as shown in the figure, using feature vectors from each of Episode 1 through Episode 4, a "content-level feature vector" can be generated by calculating the average of these feature vectors. Referring to the figure, Episode 1 has the values of [0.30063439, −0.04029956, . . . , −0.2089976, −0.36217489], Episode 2 has the values of [0.21408498, 0.39491708, . . . , −0.27379606, −0.17627634], Episode 3 has the values of [−1.08832918, 0.79819278, . . . , −1.09461893, −0.02067795], and Episode 4 has the values of [2.65969484, 1.40543097, . . . , −0.84609707, −1.22745588]. Using the averaging method, the content-level (drama-level) feature vector is defined as a single vector whose components are the average of the above vectors, which would be [0.52152126, 0.63956032, . . . , −0.60587742, −0.44664627].

The second method involves generating a single vector by sequentially concatenating the episode feature vectors. Referring to the figure, the feature vectors corresponding to Episode 1 through Episode 4 are concatenated in order, maintaining their sequence. This method has the advantage of preserving the sequential relationships between episodes while representing the overall characteristics of the drama.

In this step, the process is characterized by generating a vector (embedding) representing the entire content (drama) by utilizing the vectors (embeddings) obtained at the episode level. Both methods can be employed to ensure that, in the subsequent process of finding similar content, the features of each episode are equally reflected, while also capturing the overall storyline.

Referring back to FIG. 2, after step S240 (content-level featurization), a step to determine the similarity score (S250) between two different pieces of content can be executed. This step primarily involves determining the similarity between two different pieces of content. For clarity, the content provided by the user will be referred to as the "target content," while the content being compared will be termed the "comparison content(s)." To execute step S250, it is necessary to determine which content is designated as the target content. For this purpose, an additional step (S245) may be included prior to S250, where the user selects the target content. Furthermore, if the user wishes to analyze the similarity between the target content and a specific comparison content, a step for selecting the comparison content may also be included.

Assuming that both the target content and comparison content are determined, step S250 may include the process of calculating a similarity score using cosine similarity between the vector corresponding to the target content and the vector corresponding to the comparison content. In this process, the similarity score obtained may be normalized. Referring to Equation 4 below, the cosine similarity between two vectors obtained in the same manner can be defined as S(featN). For example, the normalized similarity score obtained by applying cosine similarity between vector 1_A (content-level feature vector embedded by PLLM) of Content A and vector 1_B (content-level feature vector embedded by PLLM) of Content B can be defined as S(feat1). Similarly, the normalized similarity score obtained by applying cosine similarity between vector 2_A (content-level feature vector embedded by Doc2Vec) of Content A and vector 2_B (content-level feature vector embedded by Doc2Vec) of Content B can be defined as S(feat2). Likewise, the normalized similarity score obtained by applying cosine similarity between vector 3_A (content-level feature vector embedded by TFIDF) of Content A and vector 3_B (content-level feature vector embedded by TFIDF) of Content B can be defined as S(feat3). After these normalized values are multiplied by their respective weights and adding them together, the final similarity score can be determined. In Equation 4 below, S(feat1), S(feat2), and S(feat3) represent the similarity scores calculated using cosine similarity as described, w1, w2, and w3 represent the weight values, and S(drama) represents the final similarity score.

It should be noted that for each of the three embedding methods previously described (embedding using PLLM, embedding by document/paragraph, and embedding based on keywords), various techniques may be applied. Consequently, the number of similarity metrics (or types of features to be compared) can be greater than three, denoted as n. In such cases, the overall similarity score can be calculated in the same manner as Equation 4, using n weights and n similarity values. That is, although Equation 4 provides an example that includes only S(feat1), S(feat2), S(feat3), and weights w1, w2, and w3, multiple additional terms may be included in Equation 4.

$$S(\text{feat1})\times w1 + S(\text{feat2})\times w2 + S(\text{feat3})\times w3 = S(\text{drama}) \quad \text{[Equation 4]}$$

After step S250 (similarity score determination), a step for selecting similar content (S260) can be executed. When similarity score calculations between the target content and various comparison contents is repeated, a cumulative similarity score with the target content can be generated, naturally listing the contents that are most similar to the target. This step may include a process of selecting a predetermined number of comparison contents with high similarity scores, and additionally, a process of outputting a comparative analysis between the selected comparison contents and the target content through a user interface may also be included.

FIG. 9 conceptually illustrates the processes described thus far. Assuming that there are scripts from Episode 1 to Episode 4, these scripts can be embedded using the first embedding method (PLLM), the second embedding method (Doc2Vec), and the third embedding method (TFIDE), resulting in episode-level text embeddings, or episode-level feature vectors. Furthermore, principal component analysis (PCA) may be performed on each of the episode-level feature vectors, leading to the acquisition of content-level feature vectors. Subsequently, through the process of determining similarity scores between two or more pieces of content, similar contents with high similarity to the target content can be selected.

FIG. 10 illustrates an example of similar content that has been ultimately selected and presented to the user via the user interface. The user is presented with a screen displaying the comparative analysis results between the target content and similar contents. The user interface may include a selection area (1000) for comparison items (such as subject matter, characters, story, and dialogue) and additional relevant information (such as suitable target audience) that can be selected by the user. Further, an analysis area (1010) may be included, which displays comparative analysis results related to the item selected by the user. For instance, as shown in the figure, when the "Subject Matter" item is selected, comparative analysis details related to the subject matter of the contents is displayed, particularly highlighting the specific similarities with relation to the subject matter between the target content and the comparison content. Additionally, at least one of the selection area (1000) or analysis area (1010) may include numerical representations of similarity for each item, enabling users to intuitively understand the similarity between the two pieces of content.

FIG. 11 illustrates a second embodiment of the similar content search method according to the present disclosure. In this embodiment, the method may initially include a step for receiving the script data of the target content (S310). This step can be implemented through various means by which the user conveys the desired target content to the similar content search system (100), such as either by directly inputting it or by uploading the data. For example, users can upload script data via a website provided by the similar content search system (100) or transfer the script data using a USB drive.

After step S310, the similar content search system (100) may perform the script data preprocessing step (S320), followed by the episode-level featurization step (S330) and the content-level featurization step (S340). These steps are substantially the same as those described earlier, and thus a detailed explanation will be omitted here.

After step S340, the similar content search system (100) may calculate similarity scores between the target content and comparison contents in a pre-established script database (S350). Based on these similarity scores, a predetermined number of similar contents can be selected (S360).

This embodiment allows users to input script data they wish to examine into the system, which will then automatically select and provide similar content. This allows the user to search for content similar to the target content, even when the script data has not yet been incorporated into the script database.

The similar content search system (100) according to the present invention may further implement a feature extraction model to extract features from content. This extraction model can obtain various types of information from scripts, including genre, theme, subject, keywords, and background details. The extracted information can be utilized in one or more stages of the similarity content search method described earlier. Moreover, leveraging this feature extraction model enables analysis of character similarities within the content, as well as the extraction of scene-level features, contributing to enhanced performance of the similar content search system (100).

Furthermore, the similar content search system (100) according to the present invention may also be implemented to perform additional functionality for extending data labels. A data label can be defined as a type of dataset containing information about specific content. For instance, a data label for Content A1 may include information such as "action" and "fantasy." When a data label for arbitrary content has already been generated, the similar content search system (100) can expand the data label by adding new information to the existing data label. For example, if a sequel (Content A2) to Content A1 is produced, the similar content search system (100) can extend the data label for Content A1 by incorporating information related to Content A2. In this case, it is preferable for the similar content search system (100) to exclude information about sequels during the script analysis process. This ensures that script analysis is not redundantly performed for similar types of content, thus improving system efficiency.

In conclusion, the similar content search method, along with the corresponding system and program according to the present disclosure, has been described. It should be noted that this disclosure is not limited to the specific embodiments and applications described above. Various modifications can be made by those skilled in the art without departing from the essence of the disclosure as claimed in the claims. Furthermore, such modifications should not be understood as distinct from the technical spirit or scope of the present disclosure.

What is claimed is:

1. A method for searching for similar content using a system comprising a CPU and memory, comprising the steps of:

(a) a script data preprocessing step for preprocessing script data for a plurality of drama contents, each drama content comprising a plurality of episodes;

(b) an episode-level featurization step for extracting episode-level features from the preprocessed script data for each individual episode of the plurality of episodes;

(c) a content-level featurization step for generating content-level features for each content of the plurality of drama contents by synthesizing the episode-level features extracted during the episode-level featurization step;

(d) a similarity score determination step in which the content-level features of a target content from among the plurality of drama contents are compared with the content-level features of other content from among the plurality of drama contents and a similarity score is determined; and (e) a step in which a similar content that is similar to the target content is selected if the similarity score meets predetermined criteria, wherein step (a), preprocessing script data for a plurality of drama contents comprises:

(i) identifying whether a drama content is a sequel of a previously processed content based on data labels or metadata;

(ii) if identified as the sequel, extending a data label of the previously processed content to the identified sequel and excluding the identified sequel from the script analysis process in step (b) to prevent redundant analysis; and (iii) if not identified as the sequel, performing a script analysis process comprising:

(a-1) an automatic review of the scripts or providing a user interface to manually review and modify the scripts as necessary to ensure data integrity for the narrative elements;

(a-2) a script breakdown process to extract narrative elements from the script data, the narrative elements including information on characters and relationships between the characters, sentiment information, and event information, by using a combination of a rule-based algorithm and a deep learning based artificial intelligence (AI) model.

2. The method according to claim 1, wherein the episode-level features extracted in the episode-level featurization step are generated as vectors having multiple dimensions, wherein the vectors are episode-level feature vectors.

3. The method according to claim 2, wherein the step of generating the episode-level feature vectors comprises a step of embedding the script data using a pretrained large language model (PLLM).

4. The method according to claim 3, wherein the step of embedding the script data using the PLLM comprises:

a step of dividing the script data into multiple chunks;

a step of generating vectors corresponding to the multiple chunks using the PLLM;

a step of generating an episode-level feature vector using the vectors corresponding to the generated multiple chunks.

5. The method according to claim 4, wherein the step of generating episode-level feature vectors using the vectors corresponding to the multiple chunks comprises generating episode-level feature vectors using a weighted average method, wherein the vectors corresponding to the plurality of chunks are weighted according to the length of each chunk.

6. The method according to claim 4, wherein the step of generating episode-level feature vectors comprises generating episode-level feature vectors by sequentially concatenating the vectors corresponding to each chunk.

7. The method according to claim 3, wherein the step of embedding the script data using the PLLM comprises embedding the script data at any internal layer that is not the final layer of the PLLM.

8. The method according to claim 3, wherein the step of generating episode-level feature vectors further comprises generating episode-level feature vectors by embedding the script data using a Doc2Vec model.

9. The method according to claim 8, wherein the step of generating episode-level feature vectors further comprises generating episode-level feature vectors by embedding the script data using TF-IDF (Term Frequency-Inverse Document Frequency).

10. The method according to claim 1, wherein the content-level featurization step is characterized in that it generates a single vector for the target content based on the episode-level features extracted in the episode-level featurization step, with the single vector being referred to as a content-level feature vector.

11. The method according to claim 10, wherein the content-level featurization step is characterized in that it generates a content-level feature vector by averaging the episode-level feature vectors, each generated in the episode-level featurization step for an episode from among the plurality of episodes included int eh in the target content.

12. The method according to claim 10, wherein the content-level featurization step is characterized in that it generates a content-level feature vector by sequentially concatenating the episode-level feature vectors, each generated in the episode-level featurization step for an episode from among the plurality of episodes included in the target content.

13. The method according to claim 10, wherein the step of determining the similarity score comprises a step of calculating the cosine similarity between the content-level feature vector of the target content and the content-level feature vector of other content to generate a first similarity score.

14. The method according to claim 13, wherein the step of determining the similarity score further comprises:

a step of normalizing the first similarity score; and a step of applying weights to the normalized first similarity score to generate a second similarity score.

15. The method according to claim 1, further comprising:

a step of generating a script database that stores script data for the plurality of drama contents prior to step (a), and wherein the other content recited in step (d) is stored in the script database.

16. A method for searching for similar content using a system comprising a CPU and memory, comprising the steps of:

(a1) a script data receiving step for receiving script data for a plurality of drama contents including a target content, each drama content comprising a plurality of episodes;

(b1) a script data preprocessing step for preprocessing the script data;

(c1) an episode-level featurization step for extracting episode-level features from the preprocessed script data for each individual episode of the plurality of episodes;

(d1) a content-level featurization step for generating content-level features for each content of the plurality of drama contents by synthesizing the episode-level features extracted during the episode-level featurization step;

(e1) a similarity score determination step in which the content-level features of the target content are compared with the content-level features of other content, stored in the script database, from among the plurality of drama contents and a similarity score is determined; and (f) a step in which a similar content that is similar to the target content is selected based on the similarity score, wherein step (a1), preprocessing script data for a plurality of drama contents comprises:

(i) identifying whether a drama content is a sequel of a previously processed content based on data labels or metadata;

(ii) if identified as the sequel, extending a data label of the previously processed content to the identified sequel and excluding the identified sequel from the script analysis process in step (b1) to prevent redundant analysis; and (iii) if not identified as the sequel, performing a script analysis process comprising:

(a1-1) an automatic review of the scripts or providing a user interface to manually review and modify the scripts as necessary to ensure data integrity for the narrative elements;

(a1-2) a script breakdown process to extract narrative elements from the script data, the narrative elements including information on characters and relationships between the characters, sentiment information, and event information, by using a combination of a rule-based algorithm and a deep learning based artificial intelligence (AI) model.

17. A similar content search system comprising a CPU and memory, wherein the CPU executes commands stored in the memory to implement the similar content search method, the method comprising:

(a) a script data preprocessing step for preprocessing script data for a plurality of drama contents, each drama content comprising a plurality of episodes;

(b) an episode-level featurization step for extracting episode-level features from the preprocessed script data for each individual episode of the plurality of episodes;

(c) a content-level featurization step for generating content-level features for each content of the plurality of drama contents by synthesizing the episode-level features extracted during the episode-level featurization step;

(d) a similarity score determination step in which the content-level features of a target content from among the plurality of drama contents are compared with the content-level features of other content from among the plurality of drama contents and a similarity score is determined; and (e) a step in which a similar content that is similar to the target content is selected if the similarity score meets predetermined criteria, wherein step (a), preprocessing script data for a plurality of drama contents comprises:

(i) identifying whether a drama content is a sequel of a previously processed content based on data labels or metadata;

(ii) if identified as the sequel, extending a data label of the previously processed content to the identified sequel and excluding the identified sequel from the script analysis process in step (b) to prevent redundant analysis; and (iii) if not identified as the sequel, performing a script analysis process comprising:

(a-1) an automatic review of the scripts or providing a user interface to manually review and modify the scripts as necessary to ensure data integrity for the narrative elements;

(a-2) a script breakdown process to extract narrative elements from the script data, the narrative elements including information on characters and relationships between the characters, sentiment information, and event information, by using a combination of a rule-based algorithm and a deep learning based artificial intelligence (AI) model.

18. A similar content search system comprising a CPU and memory, wherein the CPU executes commands stored in the memory to implement the similar content search method, the method comprising:

(a1) a script data receiving step for receiving script data for a plurality of drama contents including a target content, each drama content comprising a plurality of episodes;

(b1) a script data preprocessing step for preprocessing the script data;

(c1) an episode-level featurization step for extracting episode-level features from the preprocessed script data for each individual episode of the plurality of episodes;

(d1) a content-level featurization step for generating content-level features for each content of the plurality of drama contents by synthesizing the episode-level features extracted during the episode-level featurization step;

(e1) a similarity score determination step in which the content-level features of the target content are compared with the content-level features of other content, stored in the script database, from among the plurality of drama contents and a similarity score is determined; and (f) a step in which a similar content that is similar to the target content is selected based on the similarity score, wherein step (a1), preprocessing script data for a plurality of drama contents comprises:

(i) identifying whether a drama content is a sequel of a previously processed content based on data labels or metadata;

(ii) if identified as the sequel, extending a data label of the previously processed content to the identified sequel and excluding the identified sequel from the script analysis process in step (b1) to prevent redundant analysis; and (iii) if not identified as the sequel, performing a script analysis process comprising:

(a1-1) an automatic review of the scripts or providing a user interface to manually review and modify the scripts as necessary to ensure data integrity for the narrative elements;

(a1-2) a script breakdown process to extract narrative elements from the script data, the narrative elements including information on characters and relationships between the characters, sentiment information, and event information, by using a combination of a rule-based algorithm and a deep learning based artificial intelligence (AI) model.

* * * * *